(12) United States Patent
Takada et al.

(10) Patent No.: US 7,432,439 B2
(45) Date of Patent: Oct. 7, 2008

(54) TERMINAL BOX

(75) Inventors: Takeshi Takada, Tokyo (JP); Akihiro Takami, Tokyo (JP)

(73) Assignee: Mitsubishi Denki Kabushiki Kaisha, Chiyoda-Ku, Tokyo (JP)

( * ) Notice: Subject to any disclaimer, the term of this patent is extended or adjusted under 35 U.S.C. 154(b) by 0 days.

(21) Appl. No.: 10/552,511

(22) PCT Filed: Mar. 12, 2004

(86) PCT No.: PCT/JP2004/003257

§ 371 (c)(1),
(2), (4) Date: Oct. 6, 2005

(87) PCT Pub. No.: WO2005/088732

PCT Pub. Date: Sep. 22, 2005

(65) Prior Publication Data

US 2006/0196534 A1    Sep. 7, 2006

(51) Int. Cl.
*H02G 3/08* (2006.01)
(52) U.S. Cl. ............... 174/50; 174/58; 174/60; 174/64; 220/3.8; 439/535; 248/906
(58) Field of Classification Search .......... 174/50, 174/60, 64, 135, 49, 58, 66, 67; 220/3.2, 220/3.8, 4.02, 241, 242; 439/535, 394, 135, 439/150; 248/906; 379/413.02; 361/720, 361/600, 818
See application file for complete search history.

(56) References Cited

U.S. PATENT DOCUMENTS

| | | | |
|---|---|---|---|
| 4,560,839 A * | 12/1985 | Dillard | 379/413.02 |
| 4,729,059 A * | 3/1988 | Wang | 361/657 |
| 4,851,963 A * | 7/1989 | Miller et al. | 361/643 |
| 6,462,265 B1 | 10/2002 | Sasaoka et al. | |
| 6,765,147 B1 * | 7/2004 | Weiss et al. | 174/60 |
| 7,186,916 B2 * | 3/2007 | Jacks | 174/53 |

FOREIGN PATENT DOCUMENTS

| | | |
|---|---|---|
| JP | 5-144509 A | 6/1993 |
| JP | 8-171946 A | 7/1996 |
| JP | 9-050902 A | 2/1997 |
| JP | 11-289635 A | 10/1999 |
| JP | 2000-200919 A | 7/2000 |
| JP | 2001-024208 A | 1/2001 |
| JP | 2001-118615 A | 4/2001 |
| JP | 2001168368 A | 6/2001 |
| JP | 2002-078116 A | 3/2002 |
| JP | 2003-185175 A | 7/2003 |
| JP | 2003-303988 A | 10/2003 |
| JP | 2003-308899 A | 10/2003 |
| WO | WO 00/30216 | 5/2000 |

OTHER PUBLICATIONS

European Search Report, dated Mar. 23, 2007.

* cited by examiner

*Primary Examiner*—Dhiru R Patel
(74) *Attorney, Agent, or Firm*—Buchanan Ingersoll & Rooney PC

(57) ABSTRACT

A terminal box of an output part of a solar cell module, including a case and an outer lid that are molded with a thermoplastic resin and an removal cable cover that is of a knockout type and is arranged in the case includes an inner lid that covers to close an electric circuit that is housed in the case.

7 Claims, 5 Drawing Sheets

TERMINAL BOX

RELATED APPLICATIONS

This application claims priority under 371 to PCT Application No. PCT/JP2004/003257, filed as an International Application on Mar. 12, 2004, designating the U.S., the entire contents of which is hereby incorporated by reference in its entireties.

TECHNICAL FIELD

The present invention relates to a terminal box that includes an output part of a solar cell module in a solar power generation system, more particularly, to a terminal box to which an output cable is to be connected at an installation site.

BACKGROUND ART

A terminal box that includes an output part of a solar cell module is a box for housing an electric circuit in a case having one side open. The electric circuit includes a terminal base, a terminal block, and the like. On the terminal base, an electrode of the solar cell is connected. In the terminal block, an electric wire of a bypass diode and an output cable are connected to the terminal base. A potting material is applied on and around the electric circuit, and the side left open of the case is closed with a lid (for example, refer to the patent literature 1).

The Patent Literature 1

Japanese Patent Application Laid-Open No. 2001-168368.

The terminal boxes are of a type in which the output cable is already connected at the time of shipment, and a type in which the output cable is connected at a site of installation of a solar cell module. The terminal box of the type in which the output cable is connected at the installation site does not have a cable hole, which is a through hole, at the time of shipment; therefore, the cable hole is made, before connecting the output cable, at the installation site.

The portion of the terminal box where the cable hole is to be made on a side plate of the terminal box has a thin portion inside an annular groove, and it is possible to make a through hole by knocking out and removing a disk part inside the annular groove.

However, the conventional terminal box described above has a structure that the electric circuit is exposed when the lid of the terminal box is removed. Therefore, there has been a problem that, if heat is generated at the electric circuit due to a bad connection caused by a loosened or insufficiently tightened screw that connects the electric wire of the output cable to the terminal base in the terminal block, the lid and the terminal block that are formed with a thermoplastic resin melt, and the electric circuit becomes exposed outside the terminal box, resulting in a short circuit.

Moreover, the case of the terminal box is sometimes damaged while making the cable hole, due to slipping of a rod-shaped knockout tool when hit with a hammer. This case has also been causing the problem that the electric circuit becomes exposed outside the terminal box, resulting in a short circuit.

In view of the above description, it is an object of the present invention to provide a terminal box of which a lid and a terminal block do not melt or do not take fire even when heat is generated at an electric circuit, and of which a case is not damaged while knocking out when making the cable hole.

DISCLOSURE OF THE INVENTION

A terminal box of an output part of a solar cell module according to the present invention including a case and an outer lid that are formed with a thermoplastic resin, and a removal cable cover that is of a knockout type and is arranged in the case comprises an inner lid that covers to close an electric circuit that is housed in the case.

According to the invention, because the inner lid covers to close the electric circuit that is housed in the case, the electric circuit is closed doubly by the inner lid and the outer lid. Therefore, the case and the outer lid do not melt to be deformed or do not cause smoke and ignition even if the electric circuit generates heat due to a bad connection and the like while the terminal box is in use. Furthermore, it is possible to prevent the deterioration of performance due to corrosion or degradation in insulation of the electric circuit because the double structure realizes higher waterproof property and higher dustproof property.

The terminal box according to the next invention includes the inner lid that is formed with a flame-retardant material, and is fixed, by screws, to a cable base that is prepared in the case so as to fix an output cable placed on the cable base by holding therebetween.

According to the invention, the inner lid to protect the electric circuit can also be used as a means to fix the output cable.

The terminal box according to the next invention includes a terminal block in which a terminal base in the electric circuit and an electric wire of the output cable are connected to each other are formed with a thermosetting resin.

According to the invention, the terminal block does not melt to be deformed or does not cause smoke and ignition because of the heat generated at the electric circuit.

The terminal box according to the next invention has the removal cable cover that is of a knockout type having an annular groove formed in a side plate, and in a disk part inside the annular groove, a groove to put a tip of a rod shaped knockout tool is formed.

According to the invention, the groove to put the tip of the rod shaped knockout tool is formed near the rim of the disk part, therefore, when the tool is knocked with the hammer, a shear stress is concentrated to a part that is thin in thickness near the groove where the first rupture takes place, and because the rupture is propagated circularly, the knockout is possible to be made with a little force. Moreover, because the tip of the tool is put in the groove, it is possible to prevent a slip of the tip of the tool resulting in damaging other parts of the terminal box or the solar cell.

The knockout tool for the terminal box according to the next invention is a screwdriver, and a shape of the groove to put the tip of the knockout tool is same as a form of the tip of the screwdriver.

According to the invention, it is not necessary to prepare a special knockout tool because the knockout can be completed with the screwdriver that is used to assemble the terminal box at an installation site.

BEST MODE FOR CARRYING OUT THE INVENTION

The present invention is explained in greater detail with reference to the accompanying drawings.

Figure 1:
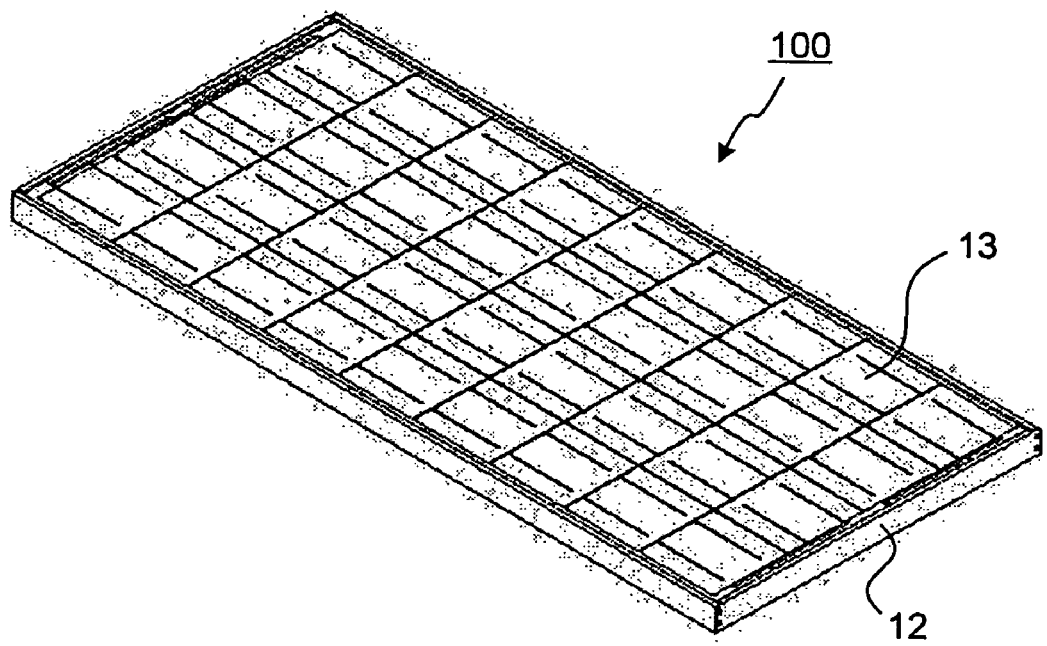
FIG. 1 is a perspective view of a solar cell module to which a terminal box according to the present invention is fixed.
Figure 2:
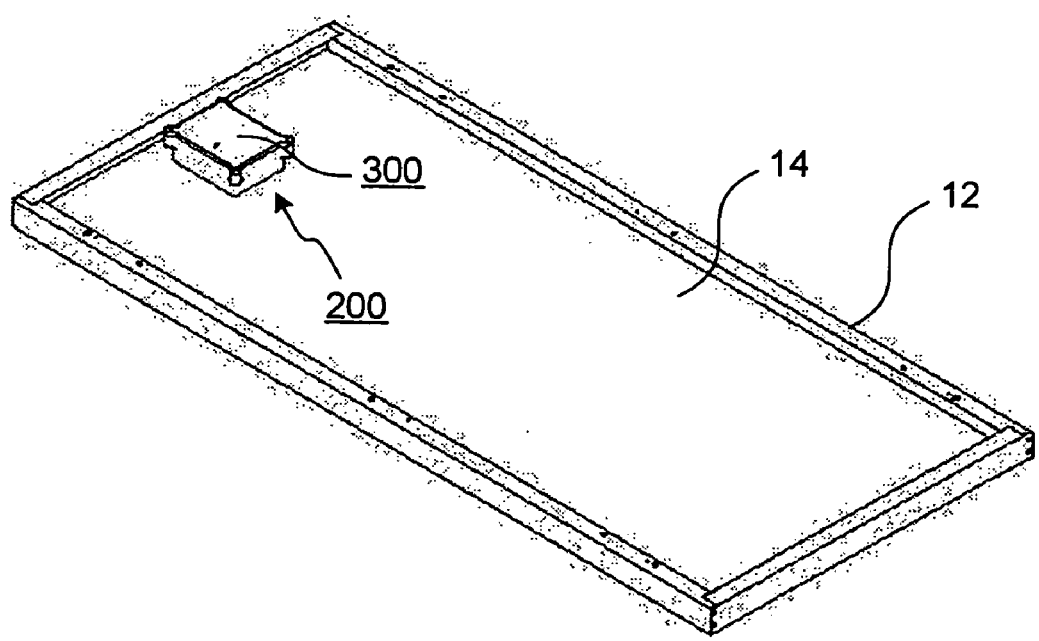
FIG. 2 is a perspective view of a back side of the solar cell module.

FIG. 1 is a perspective view of a solar cell module to which a terminal box according to the present invention is fixed, and FIG. 2 is a perspective view of a back side of the solar cell module. A solar cell module 100 includes a number of solar cells 13 that are connected in series, a supporting frame 12 that is rectangle and is made of aluminum, and a terminal box 300 that includes an output part 200. The supporting frame 12 supports the structure of the solar cell module protected with a front cover that has high translucency, a rear cover 14 that has high weather resistance, and a resin that is filled between the front cover and the rear cover. The output part 200 is fixed to the rear cover 14.

Figure 3:
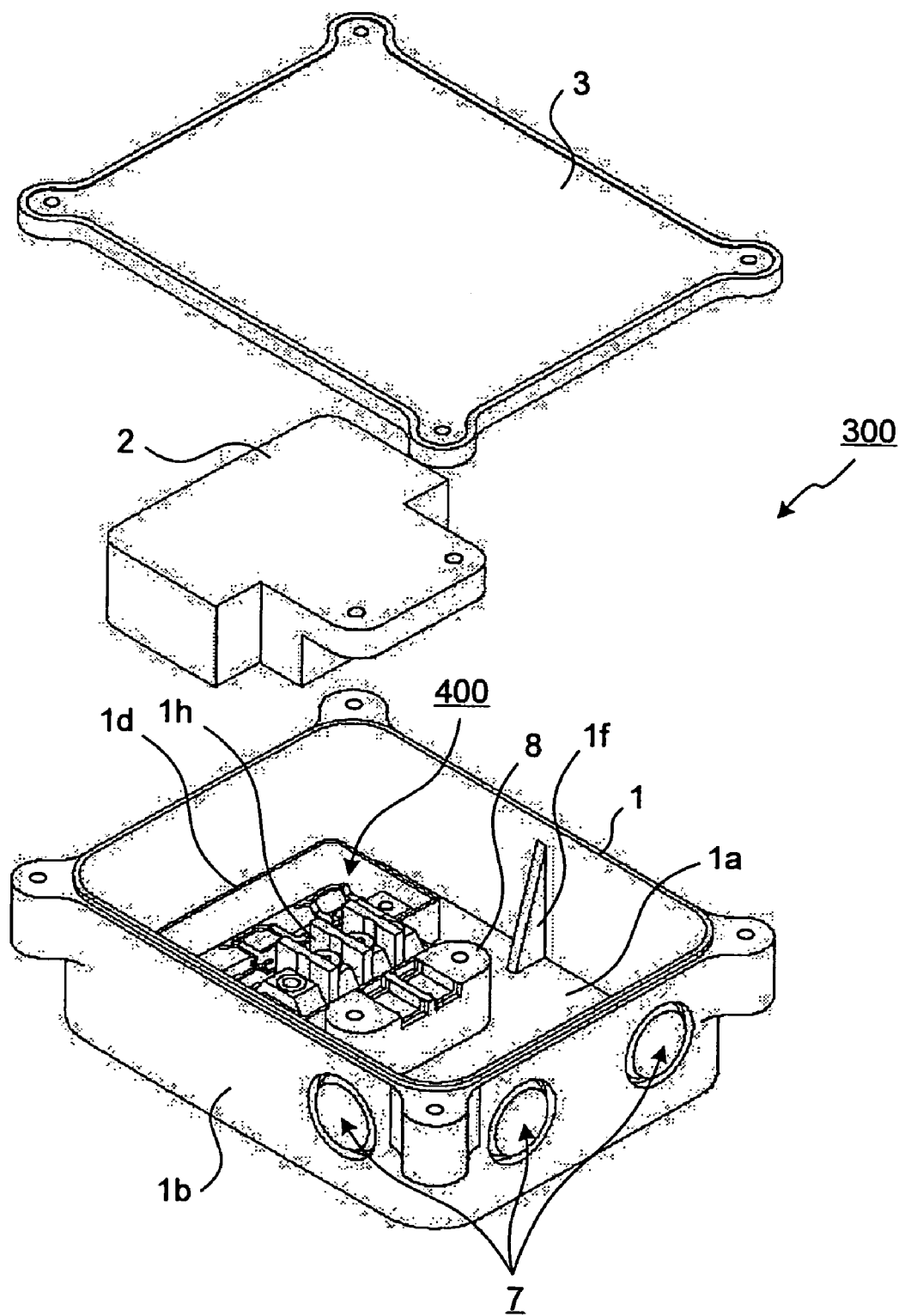
FIG. 3 is an exploded perspective view of a terminal box according to an embodiment of the present invention.

FIG. 3 is an exploded perspective view of a terminal box according to an embodiment of the present invention. The terminal box 300 includes a case 1 that is rectangular parallelepiped and has a side plate 1b that surrounds all directions of the output terminal and a bottom plate 1a leaving one side open, an inner lid 2 that covers an electric circuit 400, and an outer lid 3 to close the open side of the case 1. A triangle rib if is formed in the brink of the case 1 in the middle in length of each long side to stiffen the case 1.

Figure 4:
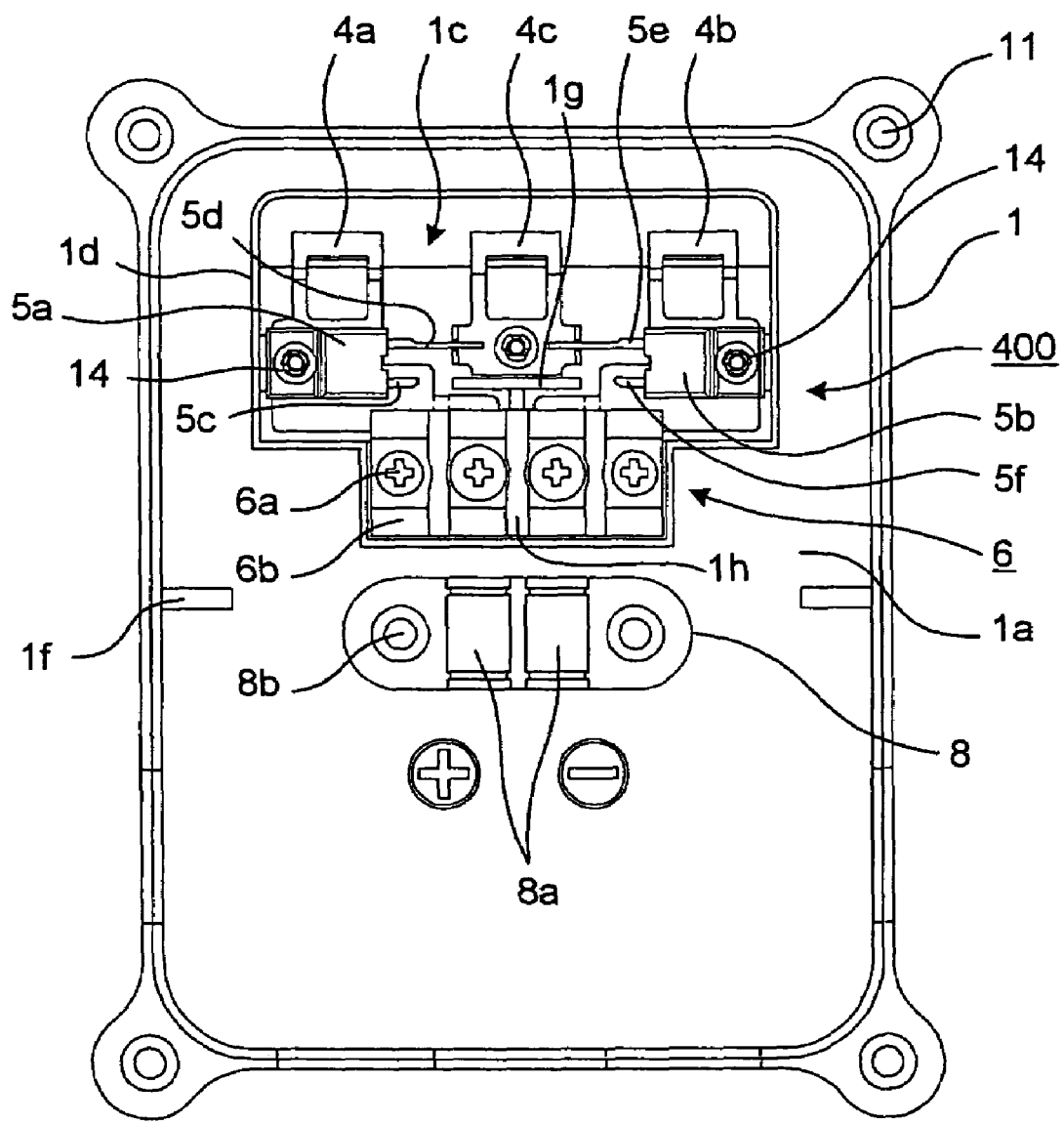
FIG. 4 is a plan view of the terminal box in a state in which an outer lid and an inner lid of the terminal box are removed.

FIG. 4 is a plan view of the terminal box in a state in which the outer lid 3 and the inner lid 2 are removed. A rectangular hole 1c is formed in the bottom plate 1a at a part that corresponds to the electric circuit 400, and through the long hole 1c, a positive electrode and a negative electrode of the solar cells 13 that are connected in series, and an intermediate electrode that is connected between the solar cells 13 that are connected in series are inserted and respectively connected to a positive terminal base 4a, a negative terminal base 4b, and an intermediate terminal base 4c of the electric circuit 400.

The positive terminal base 4a reaches to a left side of a terminal block 6 in the figure, and the negative terminal base 4b reaches to a right side of the terminal block 6 in the figure. The intermediate terminal base 4c does not reach the terminal block 6. A partition board 1g and a partition board 1h that are formed on the bottom plate 1a insulate the positive terminal base 4a, the negative terminal base 4b, and the intermediate terminal base 4c from each other.

A bypass diode 5a is overlaid on the positive terminal base 4a, and the both are put into an installation projection that are formed on the bottom board 1a, and fixed on the bottom plate 1a with a crimp ring 14. A bypass diode 5b is overlaid on the negative terminal base 4b, and the both are put into the installation projection that are formed on the bottom board 1a, and then fixed on the bottom plate 1a with the crimp ring 14. The intermediate terminal base 4c is independently put into the installation projection that is formed on the bottom plate 1a, and then fixed on the bottom plate 1a with the crimp ring 14.

A cathode electrode 5c of the primary bypass diode 5a is connected to the positive terminal base 4a, and an anode electrode 5d is connected to the intermediate terminal base 4c. A cathode electrode 5e of the secondary bypass diode 5d is connected to the intermediate terminal base 4c and an anode electrode 5f is connected to the negative terminal base 4b.

By connecting the positive terminal base 4a, the intermediate terminal base 4c, and the negative terminal base 4b through the bypass diodes 5a, 5b as described above, if a part of the solar cell module 100 is in a shade and acts as an electrical resistance, it is possible to prevent an abnormal heating of the solar cell module 100 by decreasing a current that flows through the solar cell 13, and it is also possible to make effective use of power outputted by at least a half of the solar cell 13 that is not in the shade among equally divided parts of the solar cell 13 between the bypass diodes 5a, 5b.

Each of a positive output cable and a negative output cable, which are not shown in the figure, is fit in each of two concave gaps 8a in a cable base 8, and connected to the positive terminal base 4a and the negative terminal base 4b by placing the end of the cables over the positive terminal base 4a and the negative terminal base 4b, and by putting under a press piece 6b that is pressed against the terminal block 6 by a screw 6a that is screwed into the terminal block 6.

The electric circuit 400 that includes the terminal block 6 is surrounded by a partition 1d that is formed to have a continuous convex shape on the bottom plate 1a. The case 1 is made from a thermoplastic resin, but the terminal block 6 is made from a thermosetting resin. Because the terminal block 6 is formed with the thermosetting resin having high heat resistance, the terminal block 6 does not melt to be deformed or does not cause smoke and ignition even if the electric circuit 400 generates heat on the terminal block 6 due to a bad connection caused by a poor clamping of the terminal bases 4a, 4b and the output cables.

Figure 5:
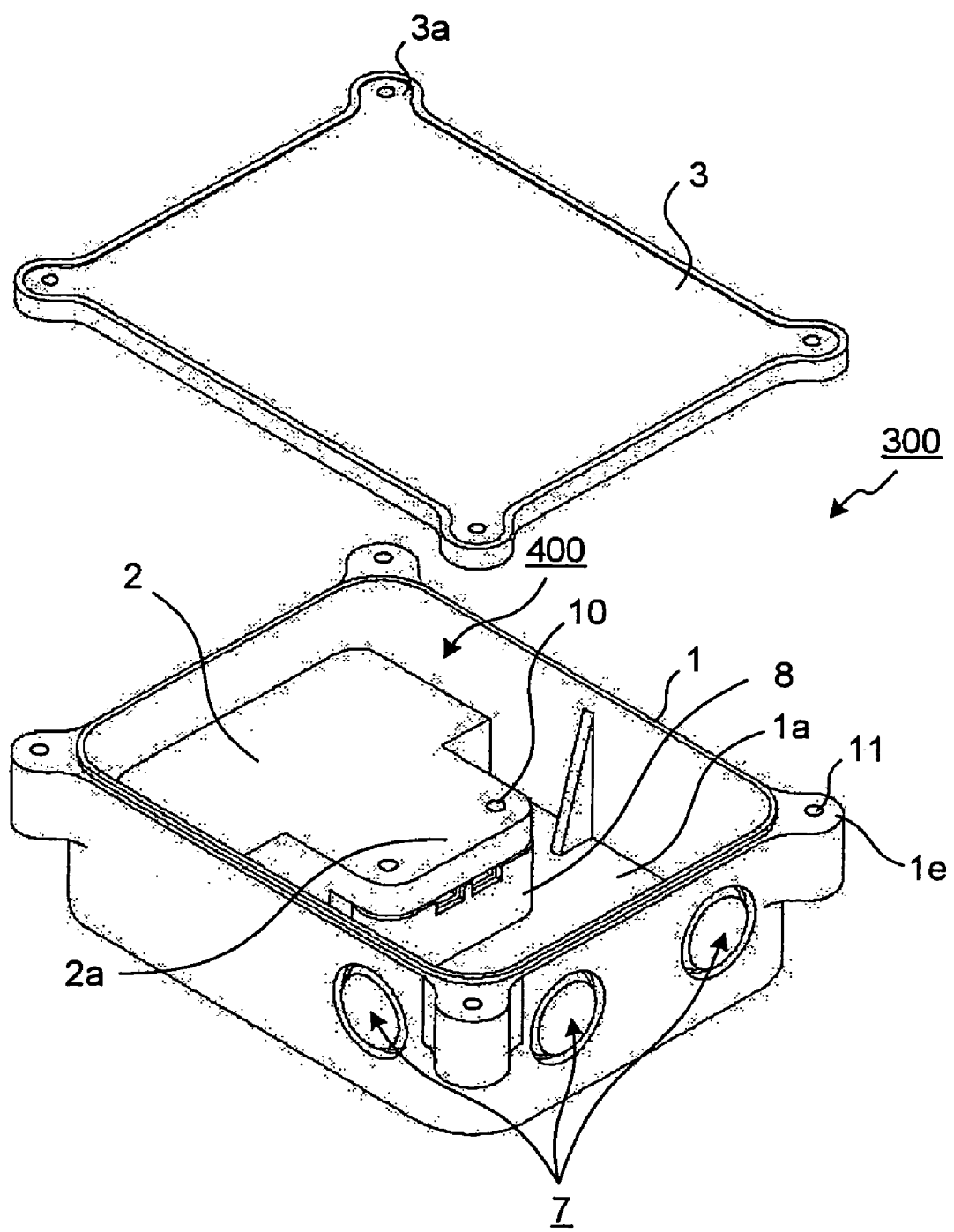
FIG. 5 is a perspective view of the terminal box in a state in which the inner lid is installed to cover an electric circuit.

FIG. 5 is a perspective view of the terminal box 300 in a state in which the inner lid is installed to cover the electric circuit 400. The positive output cable and the negative output cable are inserted into the case 1 through cable holes 7 that are made by knocking out. Each of the positive output cable and the negative output cable is placed to fit in each of the two concave gaps 8a in the cable base 8, and connected to the positive terminal base 4a and the negative terminal base 4b on the terminal block. Then the partition 1d and the electric circuit 400 are closed by covering with the inner lid 2 that has a convex external-form.

The inner lid 2 is set so that a convex tip 2a comes over the cable base 8. The output cables that are fit in the concave gaps 8a are held between the cable base 8 and the convex tip 2a, and then the inner lid 2 and the output cables are fixed to the case 1 by putting a mounting screw 10 into each of holes on both sides of the convex tip 2a, and screwing into each screw holes 8b that are prepared on both sides of the cable base 8.

It is preferable that the inner lid 2 is manufactured with a flame-retardant resin that meets V-0 of the UL (Underwriters Laboratories) standards or a metal to obtain higher flame resistance.

Finally, to close the case 1, the outer lid 3 is fixed to the case 1 by inserting a mounting screw in each of fringes 3a on each corner of the outer lid 3, and screwing the mounting screw into each screw hole 11 in each fringe 1e that are prepared on top edge of each corner of the case 1.

Because the electric circuit 400 is closed doubly with the inner lid 2 and the outer lid 3, the case 1 and the outer lid 3 do not melt to be deformed or do not cause smoke and ignition even if the electric circuit 400 generates heat due to a bad connection and the like while the terminal box 300 is in use. Furthermore, it is possible to prevent the deterioration of performance due to corrosion or degradation in insulation of the electric circuit 400 because the double structure realizes higher waterproof property and higher dustproof property.

Figure 6:
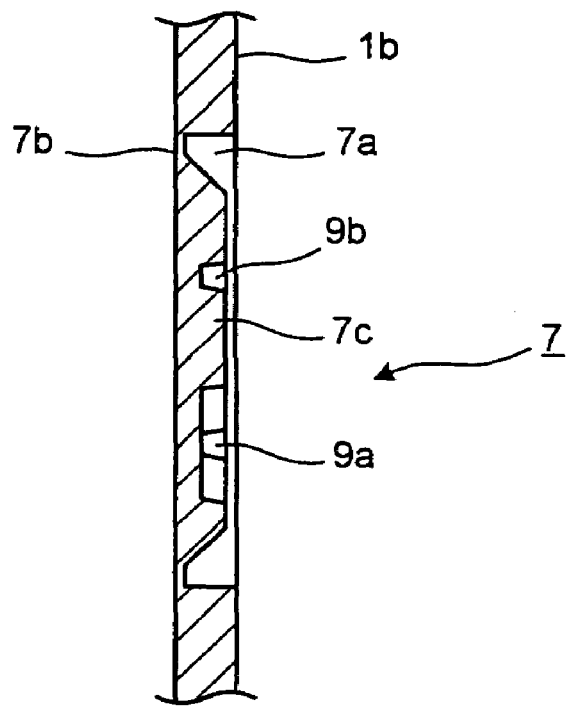
FIG. 6 is a cross-section of a removal cable cover that is a knockout type.
Figure 7:
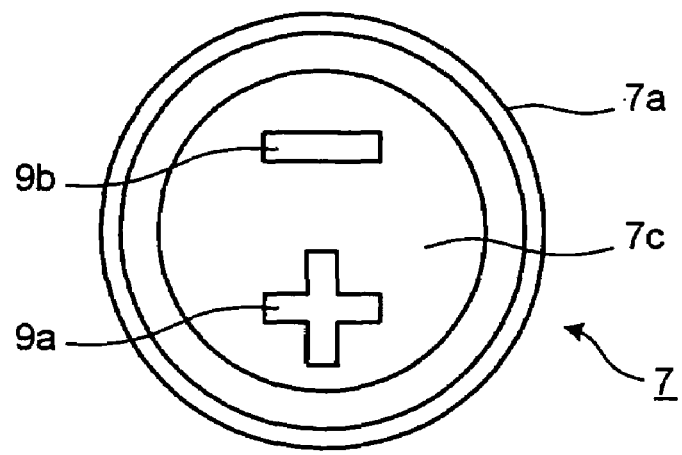
FIG. 7 is a front view of the removal cable cover that is a knockout type.

FIG. 6 is a cross-section of a removal cable cover that is a knockout type, and FIG. 7 is a front view of the removal cable cover that is a knockout type. The removal cable covers 7 that are of the knockout type and to insert the output cables are arranged in the side plate 1*b*. Two of the removal cable covers 7 are prepared on one side of the side plate 1*b* that faces to the cable base 8, and one each of the removal cable cover 7 is prepared on each side that is right and left of the side having two removal cable covers. The removal cable cover 7 that is of the knockout type includes an annular groove 7*a*, and a disk part 7*c* that is connected to the side plate 1*a* through a thin part 7*b* that is a bottom of the annular groove 7*a*.

On an outer surface of the disk part 7*c*, a plus shaped groove 9*a* and a minus shaped groove 9*b* are formed so that a tip of a plus screwdriver or a minus screwdriver that are used as a rod shaped knockout tool can be put in these grooves. Both the plus shaped groove 9*a* and the minus shaped groove 9*b* are formed near the rim of the disk part 7*c* apart from the center. The disk part 7*c* is removed because the thin part 7*b* is gets ruptured in a ring shape by knocking, with a hammer, a screwdriver of which a tip is put in the plus shaped groove 9*a* or the minus shaped groove 9*b*, thus the cable hole 7 can be made through.

The plus shaped groove 9*a* and the minus shaped groove 9*b* are formed near the rim of the disk part 7*c*; therefore, when hit with the hammer, a shear stress is concentrated to a part of the thin part 7*b* near the plus shaped groove 9*a* or the minus shaped groove 9*b* where the first rupture takes place, and because the rupture is propagated circularly, the knockout is possible to be made with a little force. Moreover, because the screwdriver is put in the plus shaped groove 9*a* or the minus shaped groove 9*b*, it is possible to prevent a slip of the tip of the screwdriver resulting in damaging other parts of the terminal box 300 or the solar cell 13.

Only either of the plus shaped groove 9*a* and the minus shaped groove 9*b* may be sufficient. It may be preferable to choose the plus shaped groove 9*a* because the minus screwdriver can also be put in the plus shaped groove 9*a*.

INDUSTRIAL APPLICABILITY

As explained above, a terminal box according to the present invention is useful for a terminal box that includes an output part of a solar cell module in a solar power generation system, particularly, for a terminal box to which an output cable is to be connected at an installation site.

The invention claimed is:

1. A terminal box comprising:
    a case formed with a thermoplastic resin and having a removal knockout type cable cover;
    an outer lid formed with a thermoplastic resin;
    an inner lid configured to cover an electric circuit that is housed in the case; and
    a cable base provided in the case for insertion of an output cable,
    wherein the inner lid has a convex tip that covers over and is fixed onto the cable base by a screw such that the output cable is held between the cable base and the convex tip of the inner lid that have been fixed to each other by the screw.

2. The terminal box according to claim 1, wherein the inner lid is formed with a flame-retardant material.

3. The terminal box according to claim 1, wherein a terminal block configured to connect a terminal base that is included in the electric circuit to an electric wire of an output cable is formed with a thermosetting resin.

4. The terminal box according to claim 1, wherein the removal knockout type cable cover includes an annular groove that is formed in a side plate, and a groove to put a tip of a rod shaped knockout tool is formed in a disk part inside the annular groove.

5. The terminal box according to claim 4, wherein the knockout tool is a screwdriver, and a shape of the groove to put the tip of the knockout tool is same as a form of the tip of the screwdriver.

6. The terminal box according to claim 1, wherein the removal knockout type cable cover includes an annular groove that is formed in a side plate.

7. The terminal box according to claim 1, wherein the outer lid has no openings therein.

* * * * *